(12) United States Patent
Gross et al.

(10) Patent No.: US 6,598,932 B2
(45) Date of Patent: Jul. 29, 2003

(54) DRIVER'S CAB SUSPENSION

(75) Inventors: Alexander Gross, Bischofsheim (DE); Roy van Wynsberghe, Schweinfurt (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/077,349

(22) Filed: Feb. 15, 2002

(65) Prior Publication Data

US 2002/0113463 A1 Aug. 22, 2002

(30) Foreign Application Priority Data

Feb. 17, 2001 (DE) .......................... 101 07 626

(51) Int. Cl.[7] .............................................. B62D 33/06
(52) U.S. Cl. .................. 296/190.07; 180/89.13
(58) Field of Search .................. 296/190.07, 190.01; 180/89.13

(56) References Cited

FOREIGN PATENT DOCUMENTS

| DE | 19522354 A1 * | 1/1996 | ........... B62D/33/10 |
|----|---------------|--------|----------------------|
| GB | 2 014 522     | 8/1979 |                      |

* cited by examiner

*Primary Examiner*—D. Glenn Dayoan
*Assistant Examiner*—Patricia Engle
(74) *Attorney, Agent, or Firm*—Cohen, Pontani, Lieberman & Pavane

(57) ABSTRACT

Driver's cab suspension, particularly for a conventional cab vehicle, comprising a vehicle frame which supports a driver's cab by at least three springs. At least two springs are arranged in a front area of the driver's cab and the at least one other spring is arranged in a rear end area of the driver's cab. A stabilizer arranged transverse to the vehicle frame opposes the roll movement of the driver's cab. The stabilizer extends in the rear end area of the driver's cab.

6 Claims, 5 Drawing Sheets

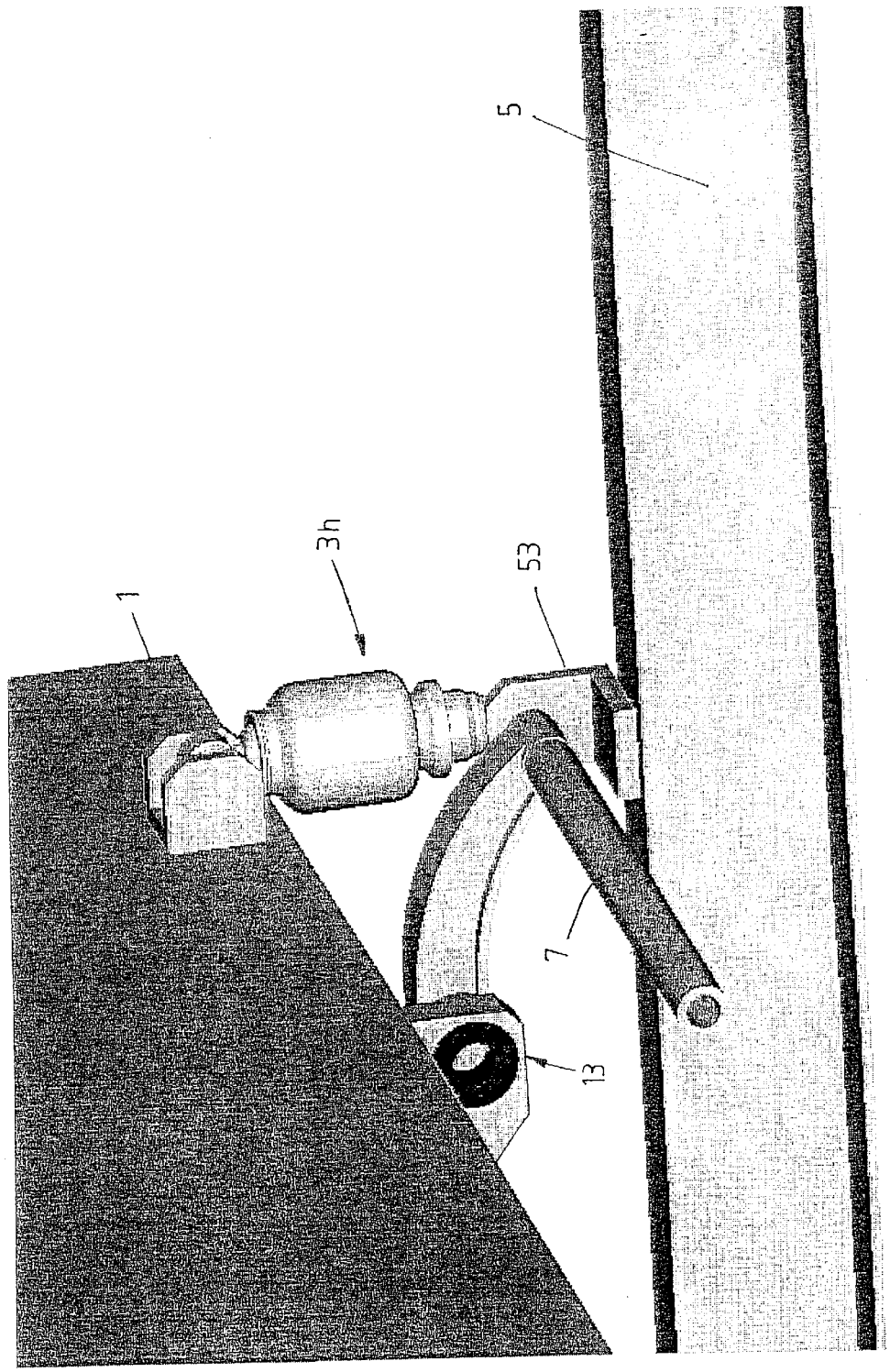

DRIVER'S CAB SUSPENSION

BACKGROUND OF THE INVENTION

1. Field of the Invention

The invention is directed to a driver's cab suspension for commercial vehicles wherein the cab is supported on the vehicle frame by at least two springs at the front of the cab and at least one spring at the rear of the cab, a stabilizer arranged transversely to the frame opposing roll movements of the cab.

2. Description of the Related Art

GB 2,014,522 discloses an air suspension system for driver's cabs of commercial vehicles having four air springs supporting the driver's cab. Additional air springs are used for roll stability. The air suspension system can be used in driver's cabs for conventional cab vehicles and for forward control vehicles.

The "Scania Model T cab" has a 4-point air suspension combined with a stabilizer. The stabilizer extends transversely in a front region of the driver's cab. The engine of the vehicle takes up considerable space, so that the stabilizer must be mounted so as to be elevated in supports. Understandably, these supports must absorb considerable forces. Consequently, the supports have a correspondingly heavy-duty construction. Further, the stabilizer extending over the engine impedes access for maintenance and repair work and limits freedom of design in the hood region.

SUMMARY OF THE INVENTION

It is the object of the present invention, to provide a driver's cab suspension, particularly for a conventional cab vehicle, which favorably utilizes the given installation space and in which simple supporting elements can be used for the driver's cab suspension.

According to the invention, this object is met in that the stabilizer extends in the rear end area of the driver's cab.

The construction of the bearing support for the stabilizer is appreciably simplified in this advantageous mounting location. In a conventional cab vehicle, the center of gravity of the driver's cab lies in the rear area. Accordingly, the dimensioning of the driver's cab structure is greater in the rear area, which makes for a more favorable introduction of force from the stabilizer into the driver's cab. Further, in many conventional cab vehicles, the vehicle width is smaller in the front region of the driver's cab than in the rear end area. Consequently, a longer stabilizer can be used in the rear end area than in the front area, which leads to advantages by definition.

In order to be able to achieve the best possible roll stability in principle, the springs are fastened to the outer side of the vehicle frame and the stabilizer is longer than the outside distance between air spring units. The supporting effect of the springs is positively influenced by the external fastening.

In another advantageous construction, the driver's cab has four air spring units and the stabilizer is in an operative connection with the two air spring units in the end area of the driver's cab.

In this connection, a simple assembly and small number of structural component parts are achieved in that the air spring suspension and an end of the stabilizer share a common connection bearing to the driver's cab.

Alternatively or in combination with a common connection bearing to the driver's cab, a frame-side connection bearing of the air spring unit and a frame-side swivel bearing of the stabilizer form a constructional unit.

Further, it is provided that the air spring unit and a vibration damper together form a spring strut. A valve for supplying or letting off air for the air spring can be arranged directly inside the air spring unit in order to further optimize space and reduce structural component parts.

In order to minimize loading for the passengers of the driver's cab in the event of an accident, the fastening of the vibration damper is carried out as a predetermined deformation point which enables angular movement of the vibration damper when the load exceeds a normal operating load. In this way, the driver's cab can displace along the longitudinal axis of the vehicle frame within limits and can remove a considerable portion of the crash impact.

According to an advantageous embodiment, the predetermined deformation point is formed by a clamp in which the vibration damper is clamped.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be farther understood that the drawings are not necessarily drawn to scale and that, unless otherwise indicated, they are merely intended to conceptually illustrate the structures and procedures described herein.

BRIEF DESCRIPTION OF THE DRAWINGS

FIG. 5 shows an air spring unit and stabilizer with a common frame-side connection bearing.

DETAILED DESCRIPTION OF THE PRESENTLY PREFERRED EMBODIMENTS

Figure 1:
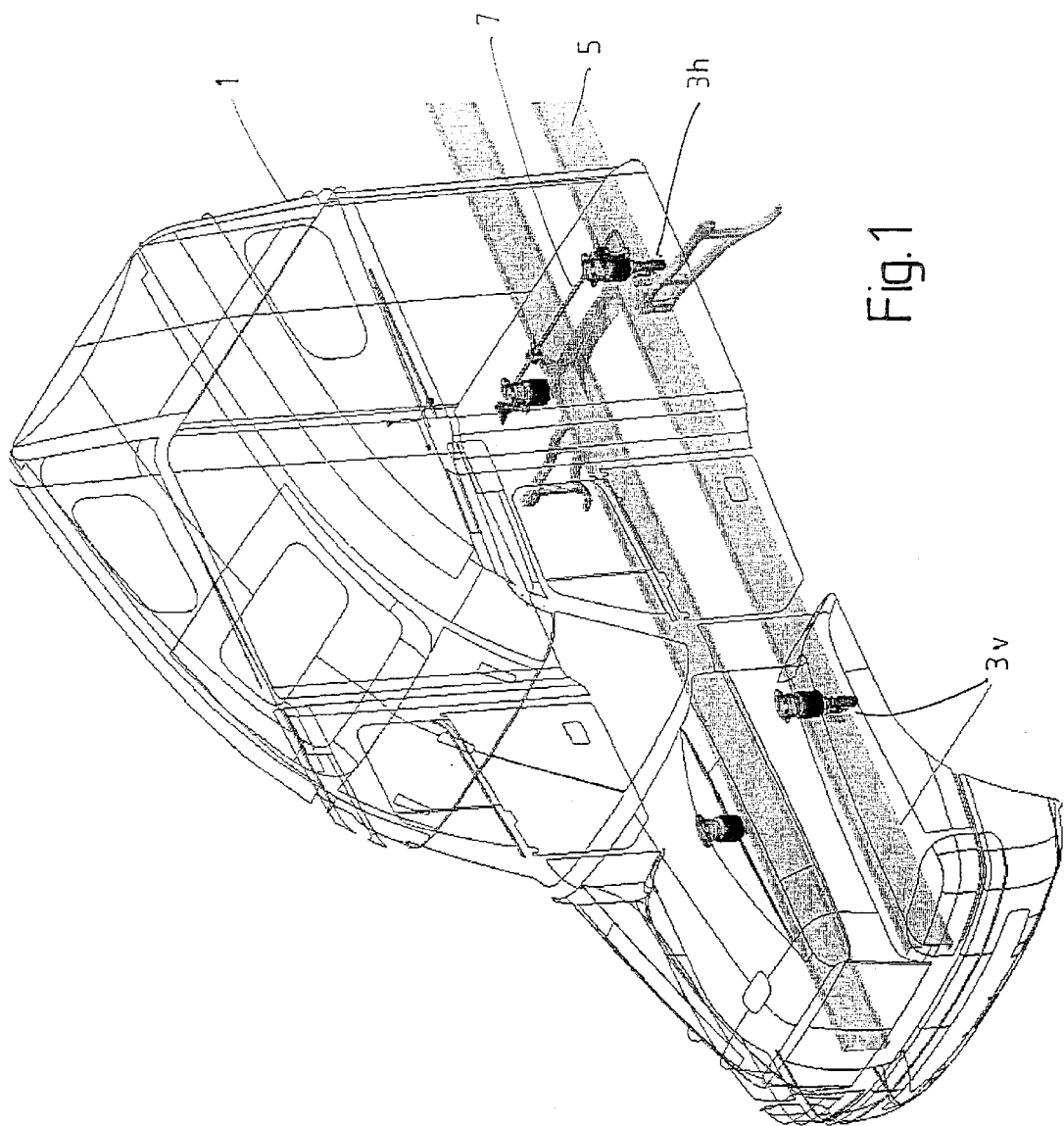
FIG. 1 shows a driver's cab with cab suspension.

FIG. 1 is a grid diagram showing a driver's cab 1 of a conventional cab type commercial vehicle. The driver's cab is supported by four air spring units $3v$; $3h$ on a ladder-shaped vehicle frame 5. Two air spring units $3v$ are arranged in the front area and two air spring units $3h$ are arranged in the rear end area. Further, a stabilizer 7 arranged in the rear end area of the cab transverse to the vehicle frame is used to support the driver's cab relative to rolling movements. A comparatively longer stabilizer can be used in the rear end area because, in many cases, the driver's cab is narrower in the front area and a smaller usable length is accordingly available for the stabilizer.

Figure 2:
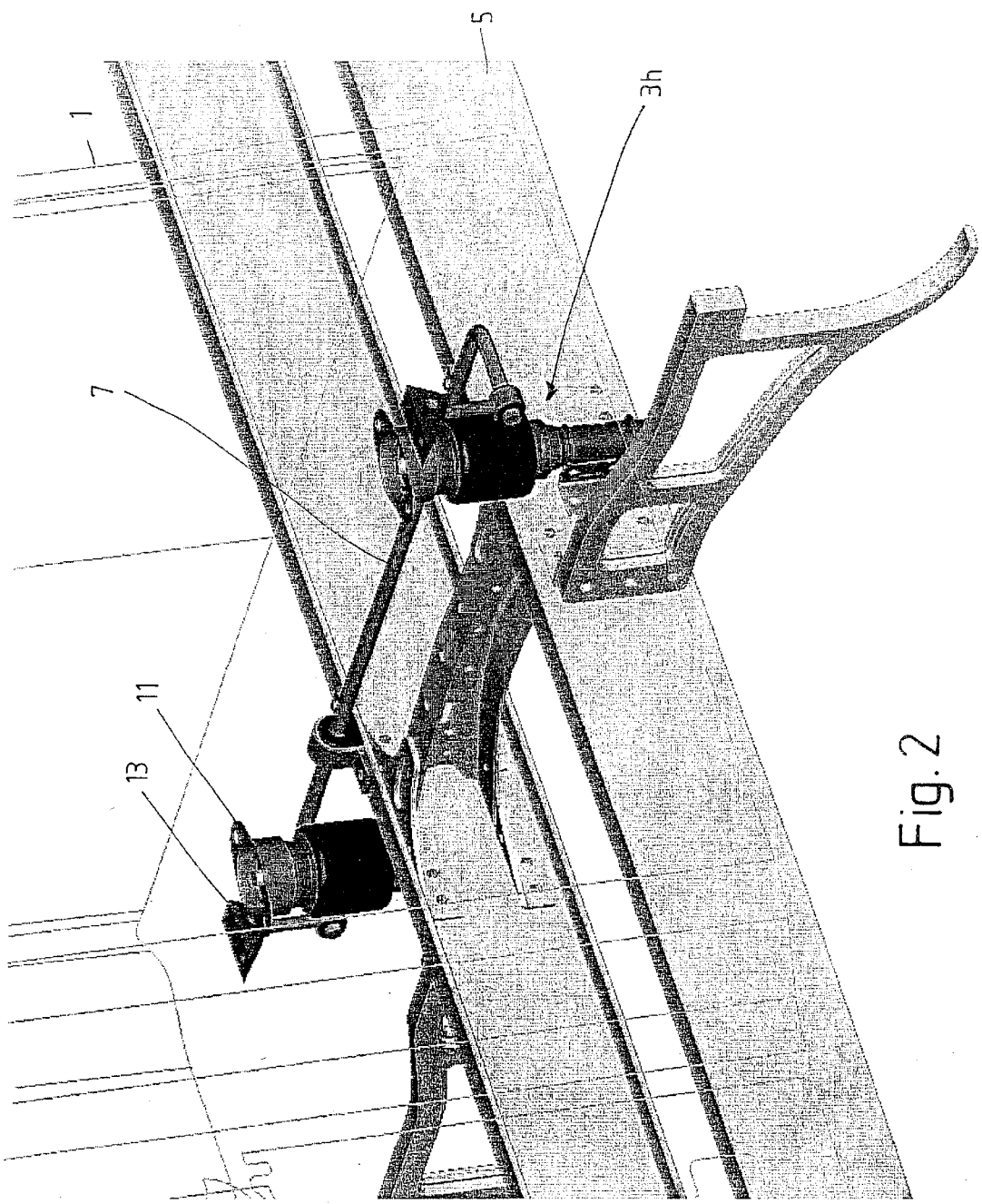
FIG. 2 shows a stabilizer arrangement with air spring units.

It will be seen from FIG. 2 that the air spring unit $3h$ is fastened to the outer side of the vehicle frame 5, and the stabilizer 7 is constructed so as to be longer than the outside spacing of the air spring units $3h$ so as to achieve the longest possible lever arm for the stabilizer. Further, the stabilizer can be fastened very close to the vehicle frame so as to avoid costly bearing mountings for the stabilizer. The stabilizer 7 and the air spring unit $3h$ have separate connection and fastening bearings 13, 11, respectively, to the driver's cab.

Figure 3:
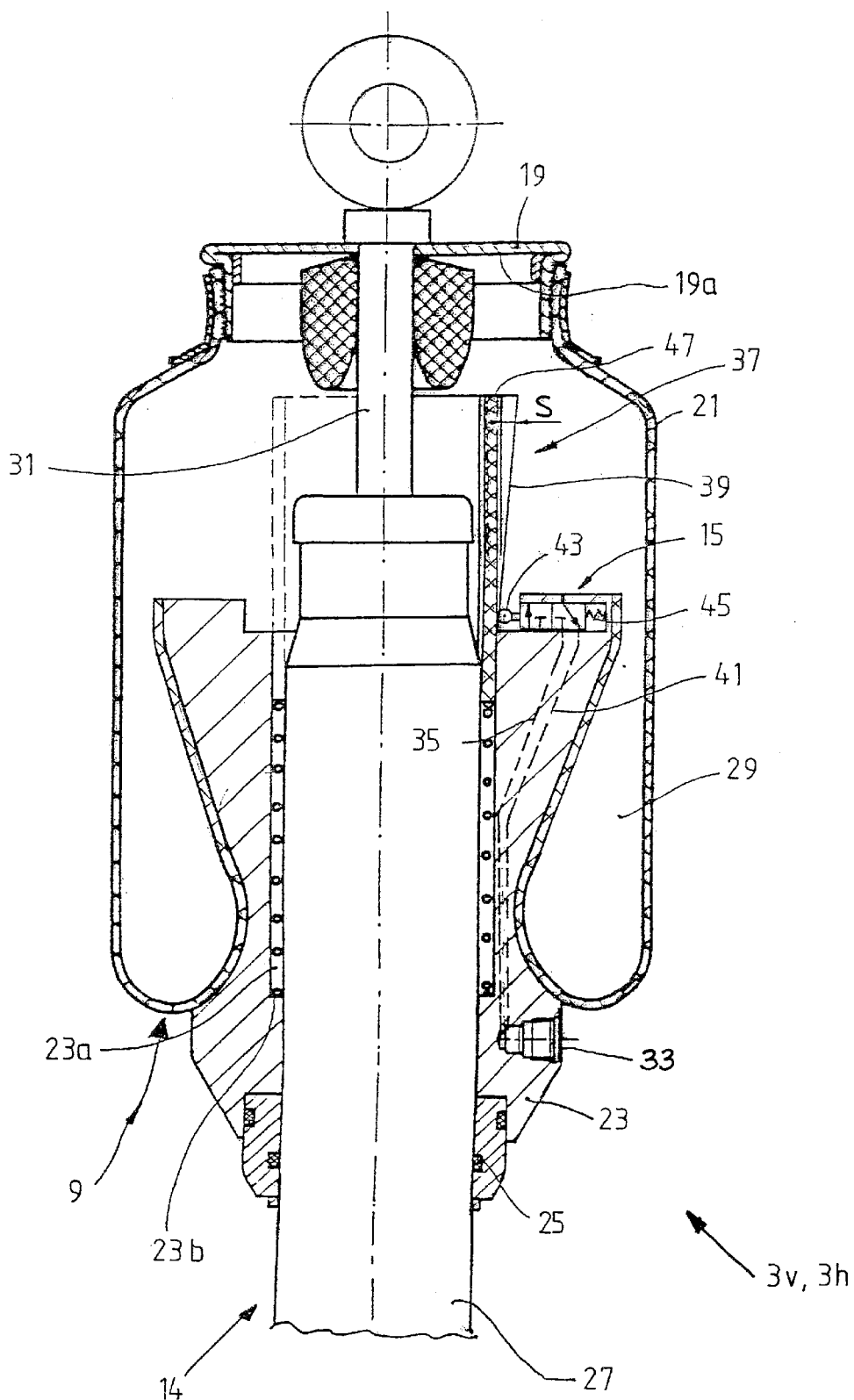
FIG. 3 shows a construction example of an air spring unit.

Together with an air spring 9 and a hydraulic vibration damper 14, such as that known from FIG. 3, for example, which is arranged concentric to the air spring, the air spring unit $3v$; $3h$ forms a spring strut. At least one air spring 9 is connected to a pressure source, not shown, via a supply connection, a control valve 15 being connected therebetween as part of the air spring 9. Supply is carried out by a compressor unit.

The air spring 9 has an outer tube 19 to which one end of a spring bellows 21 is fastened, the other end of the spring bellows 21 being clamped to a roll tube 23. The roll tube 23 is sealed relative to the vessel tube 27 by seals 25. A spring space 29 which is under pressure is defined by the spring bellows 21 and the outer tube 19.

A piston rod 31 which, together with the vessel tube 27, is a component part of a vibration damper is in an operative connection with the outer tube 19. The air spring 9 accordingly comprises two air spring subassemblies which are movable relative to one another. A first air spring subassembly comprises the outer tube with the piston rod and possibly add-on parts such as a rebound stop or stop buffer. A second air spring subassembly comprises the roll tube 23 and the vessel tube 27 and the parts fastened to the above-mentioned components. A supply connection 33 is arranged inside the roll tube 23 and passes into a compressed-air feed line 35 for the control valve 15. The compressed-air feed line 35 opens into the spring space. The control valve 15 which influences the compressed-air supply is arranged at the output of the compressed-air feed line 35 in the spring space 29.

The control valve 15 is depicted in a circuit diagram as a 3/2 directional control valve by way of example. Of course, the control valve could also conceivably have a switching position with simultaneously blocked outlet line and compressed-air feed line 35, 41, respectively, which position is occupied in the range of the normal position of the travel path of the air spring.

The control element 37 actuates a transmission element 43 which, in turn, determines various switching positions of the control valve 15. A guide path 39 is constructed in the form of an oblique plane at the control element. A change in the travel position of the control element 37 relative to the control valve 15 results in a change in the radial adjusting path s from the guide path to the transmission element 43. A restoring spring 45 provides for constant contact of the transmission element 43 on the guide path 39 and accordingly exerts an adjusting force on the control valve 15 when the piston rod 31 of the air spring moves in the extension direction.

When the control element 37 is constructed conically in the area of the guide path 39, the adjusting path s for the transmission element 43 is not dependent upon a rotating movement of the control element 37 caused by vibrations. In a construction of this type, there is no need to take precautions with respect to an installation and operating position of the control element 37 oriented in circumferential direction relative to the control valve 15. The control element 37 is actuated through a cover surface 19a of the outer tube 19 via the end face 47, wherein the guide path likewise has an effective length corresponding to approximately half of the travel path of the air spring.

Figure 4:
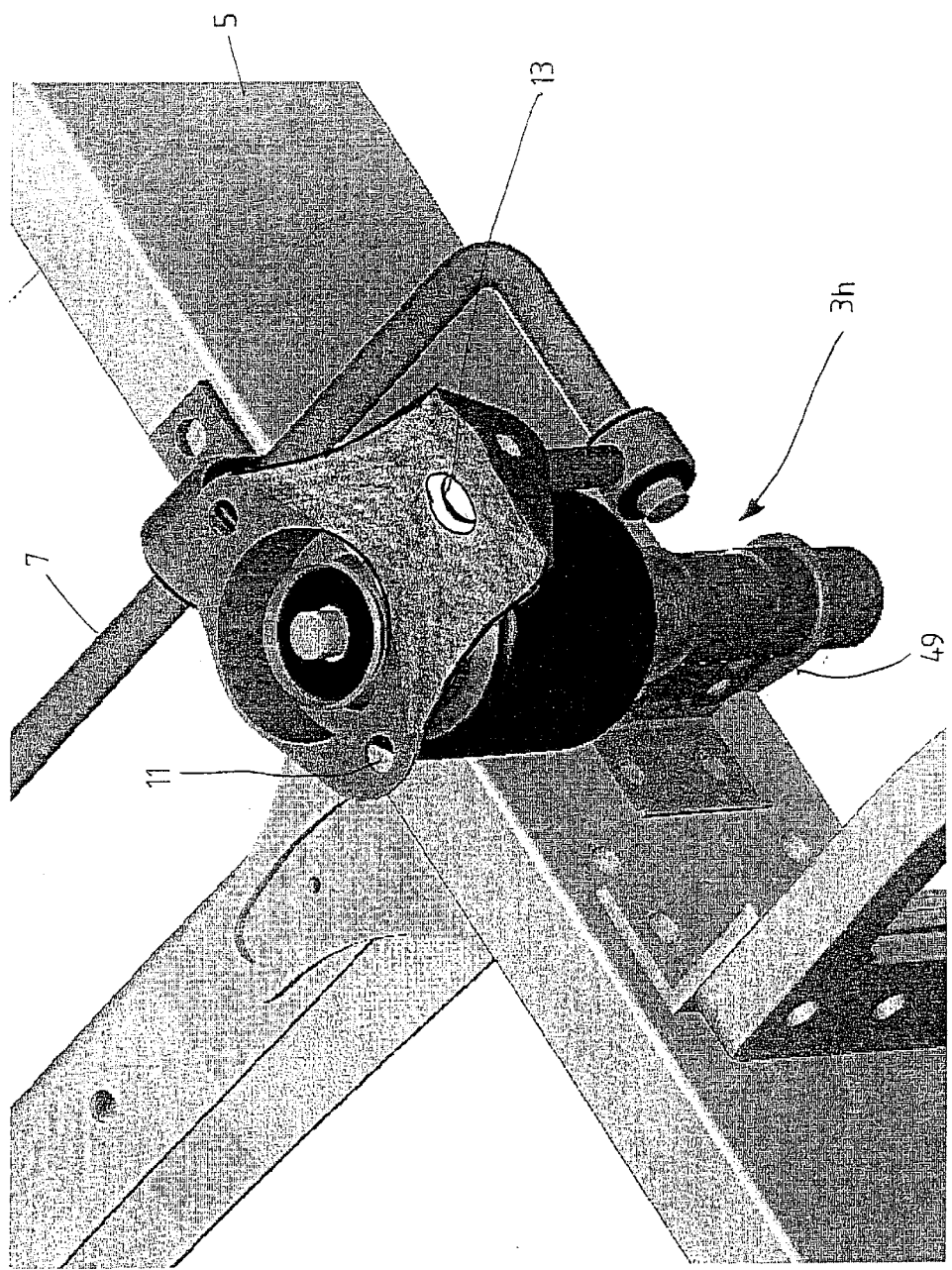
FIG. 4 shows an air spring unit and stabilizer with common cab-side connection bearing.

FIG. 4 shows a variant in which the driver's cab-side connection bearing 11 of the air spring unit 3h and the fastening bearing 13 of the stabilizer 7 form a constructional unit. In this way, a considerable advantage is achieved with respect to assembly. Further, it will be seen that there is a clamp 49 by which the air spring unit is fastened to the outside of the vehicle frame 5. The clamp is designed in such a way that it forms a predetermined deformation point in the event of an accident. The predetermined deformation point allows a defined displacing movement of the driver's cab along the vehicle frame without the driver's cab being separated from the air spring units. The advantage of an air spring unit constructed as a spring strut is that only vertical movements of the driver's cab can occur as a result of the frame-side fastening by means of a clamp 49.

FIG. 5 shows another advantageous combination of the stabilizer 7 with the rear air spring units 3h. A frame-side connection bearing 51 for the air spring unit 3h and a swivel bearing 52 for the stabilizer 7 likewise form a constructional unit. In this variant, the stabilizer takes over the guidance of the driver's cab 1. In this case, also, the air spring unit 3 is arranged by means of an angular support 53 outside the vehicle frame 5. The stabilizer 7 is connected to the cab by a pivot arm 54 and a bearing 55 at the cab.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A suspension for supporting a driver's cab on a frame of a vehicle, said cab having a front area and a rear end area, said frame having a pair of outer sides extending from said front area to said rear area, said suspension comprising two air spring units arranged at the front area of the cab, two air spring units arranged at the rear end area of the cab, a stabilizer arranged transversely to the frame at the rear end of the cab, said stabilizer opposing roll movements of the driver's cab.

a pair of constructional units at the rear end area of the cab, each said constructional unit comprising a frame-side connection bearing for a respective said air spring unit and a frame side swivel bearing for a respective end of the stabilizer.

2. A suspension as in claim 1 wherein the two air spring units at the rear end area of the cab are fastened to respective outer sides of the vehicle frame, said stabilizer being longer than an outside distance between the two air spring units at the rear end area of the cab.

3. A suspension as in claim 1 further comprising a pair of connection bearings fixed to the rear end area of the cab, one of said air spring units at the rear end area of the cab and one of the ends of the stabilizer being connected to each of said bearings.

4. A suspension as in claim 1 further comprising a plurality of vibration dampers for respective said air spring units, each said vibration damper and each said respective air spring unit together forming a spring strut.

5. A suspension as in claim 4 wherein each said vibration damper is fastened to the vehicle frame at a predetermined deformation point which allows the driver's cab to be displaced along the frame without being separated form the air spring units when the load on the cab exceeds a predetermined load.

6. A suspension as in claim 5 wherein said predetermined deformation point comprised a clamp fixed to said frame, said vibration damper being clamped in said clamp.

* * * * *